April 8, 1947. E. M. IRWIN 2,418,553
FLUX MEASURING SYSTEM
Filed Aug. 3, 1943 2 Sheets-Sheet 1
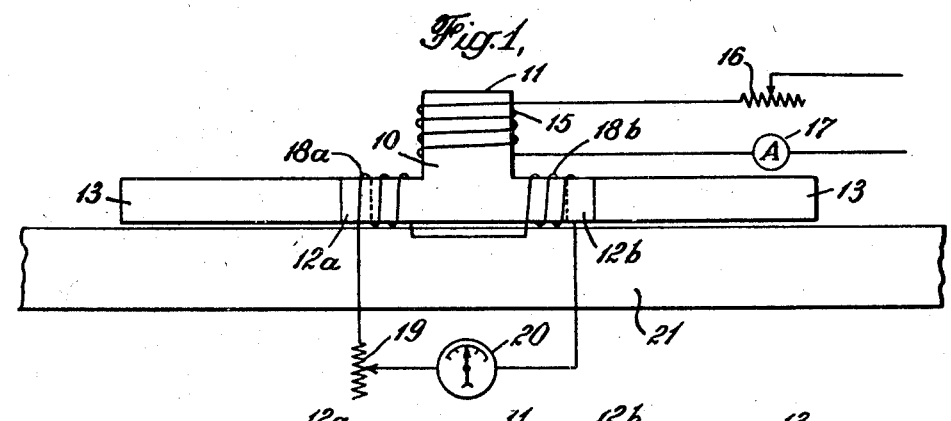
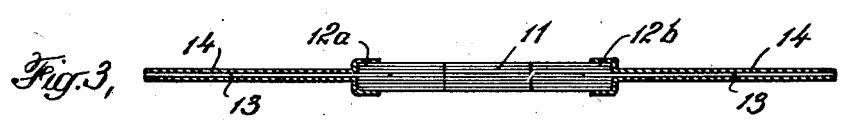
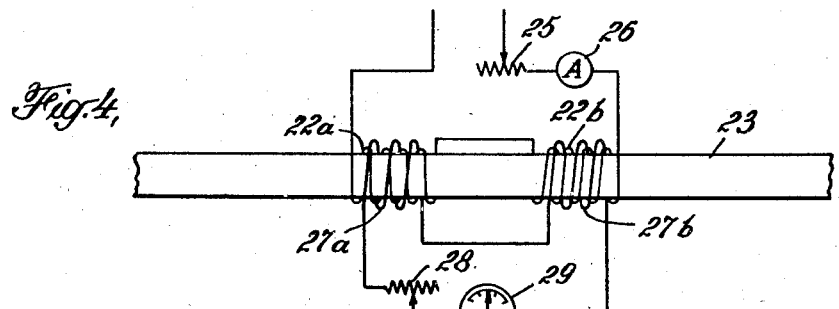
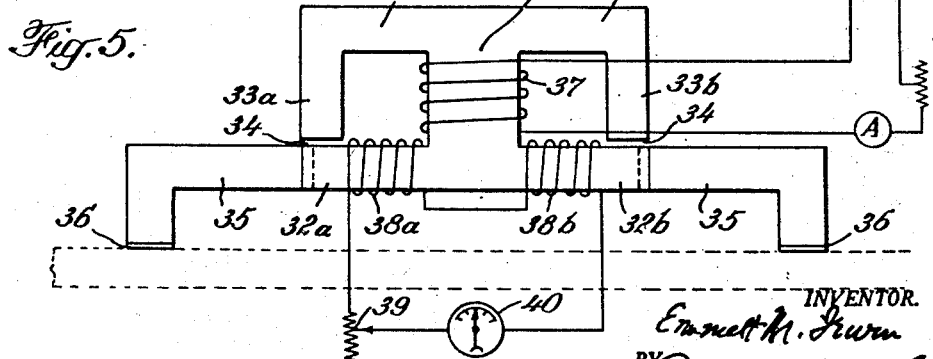
INVENTOR.
Emmett M. Irwin
BY
ATTORNEYS

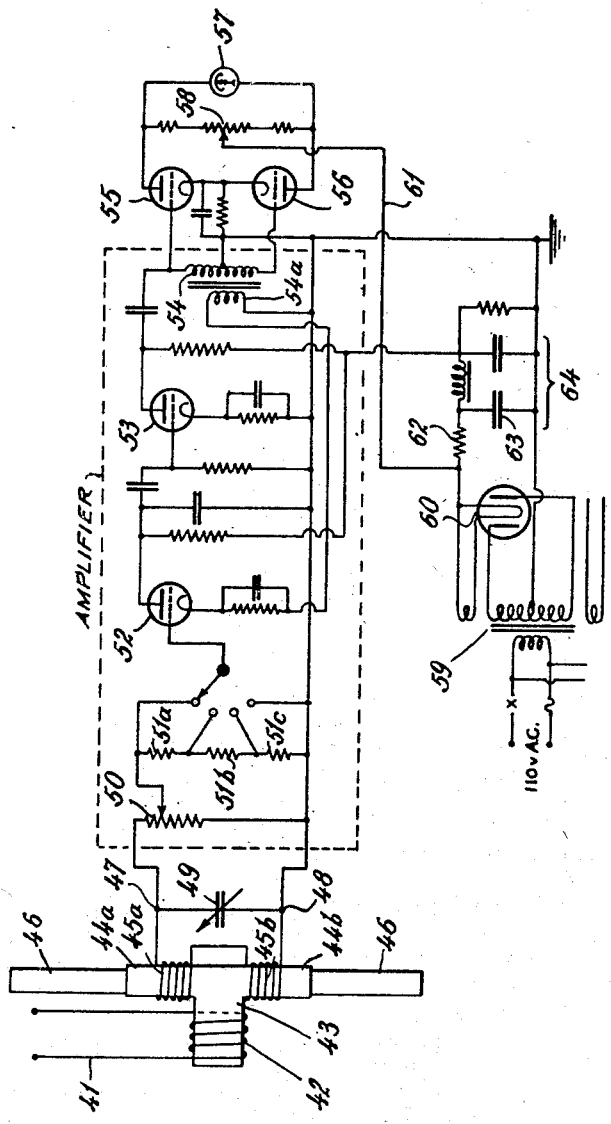

Patented Apr. 8, 1947

2,418,553

UNITED STATES PATENT OFFICE 2,418,553

FLUX MEASURING SYSTEM

Emmett M. Irwin, San Marino, Calif.

Application August 3, 1943, Serial No. 497,183

3 Claims. (Cl. 177—380)

This invention relates to the detection and measurement of magnetic fields, as, for example, the earth's field, the fields set up by permanent magnets or direct current machinery, or the field resulting from residual magnetism in a specimen. More particularly, the invention is concerned with a novel method for detecting and measuring magnetic fields and with a simple apparatus by which that method can be readily put into practical use.

The detection and meaurement of magnetic fields is of importance in many connections, as, for example, there are, at the present time, many structures and machines used for both war purposes and otherwise, whose usefulness would be seriously impaired by the presence of magnetized parts, and it is, accordingly, necessary to insure that such parts are fully demagnetized before they are assembled in such structures or machines. In airplane construction, for example, the inclusion in a plane of magnetized parts may cause errors in compass readings and similarly, ships are now commonly equipped with demagnetizing apparatus so that they may not set off magnetic mines strewn by the enemy.

Most methods now in use for determining the magnetic properties of a specimen are unsatisfactory for the purpose of determining the residual magnetism in a part, because they require that the magnetic condition of the part be altered during the examination. Thus, such methods may involve subjecting the specimen to a field for the purpose of reversing the polarity of the flux supposedly present in the specimen, so that, if the specimen has recently been treated to demagnetize it, examination of its magnetic condition by such methods may well result in its remagnetization.

The present invention is, accordingly, directed to the provision of a method for detecting and measuring magnetic fields, such as that arising from the residual magnetism in a specimen, which does not involve the disturbance or alteration of the flux in the specimen. By the practice of the method, the specimen can be examined for the presence or absence of flux and the amount and polarity of the flux can be readily determined. The new method comprises placing a magnetically permeable member in the field to be explored in such position that a portion of the lines of force in the field pass through the member. At the same time, an alternating flux is passed through adjacent sections of the member in opposite directions, so that in one section at any instant, the alternating flux and the continuous flux arising from the field are additive, while in the other section, they are subtractive. Each section of the member is encircled by a winding and the windings are connected in series. Because of differences in the saturation of the two sections, the flux threading one coil is always greater than that threading the other on each alternation of the exciting current and the result is an unbalanced induced voltage across the coils which is of frequency twice that of the exciting voltage or a second harmonic of the latter. The induced voltage is then employed for measuring the strength of the field being explored.

The apparatus for practicing the new method includes the magnetically permeable member above mentioned, means for inducing alternating flux of equal amount but opposite sign in adjacent sections of the member, coils in which voltages are induced by the total flux in each section, and means for indicating the sum of the voltages. Suitable amplifying means may also be included in the apparatus.

For a better understanding of the invention, reference may be made to the accompanying drawing in which Fig. 1 is a diagrammatic view of the apparatus with certain parts shown in elevation;

Figs. 2 and 3 are plan views of different forms of core and pick-up arms employed in the apparatus;

Fig. 4 is a view similar to Fig. 1 showing a modified construction permanently installed, as, for example, on shipboard;

Fig. 5 is a view similar to Fig. 1 showing a modified construction; and

Fig. 6 is a wiring diagram of one form of the apparatus.

The apparatus illustrated in Fig. 1 includes a core 10 of inverted T-shape and made up of one or more laminations of a suitable ferromagnetic material of good permeability, such as the various transformer core steels. The laminations are preferably quite thin, as, for example, 29 to 26 gage. The core includes a main leg 11, formed at one end with similar integral extensions 12a, 12b, the width of which is half that of the main leg. Extending outwardly from the free end of each extension is a magnetic pick-up arm or wing 13, which is preferably made of a single lamination of metal of high permeability, such as Mu-metal. If the core is made of a single lamination, the pick-up arms may be formed integrally with the extensions, but the use of a plurality of laminations, such as four, for the core, and of a single lamination for each pick-up arm gives best results and is, therefore, preferred. Accordingly, in the preferred construction, the pick-up arms are separate from the core and they may be mounted in place in various ways, as, for example, one end of each arm may be inserted for a short distance between two of the laminations of the core, as shown in Fig. 2. If desired, holes may be drilled through the extensions and one end of each arm, and the arms held in place by bolts inserted through the holes. In another arrangement shown in Fig. 3, strips of brass or other non-magnetic material 14 are attached to the arms and the inner ends of the strips are shaped to enclose the outer ends of the extensions.

An exciting winding 15 is wound upon the main leg 11 of the core and supplied with alternating current from a suitable source, an adjustable resistor 16 and an ammeter 17 being included for control purposes in one of the leads to the winding, if desired. Similar secondary windings 18a and 18b are wound on the extensions 12a, 12b of the core and these windings are connected in opposition. It will be apparent that flux induced in the core by the exciting winding will pass in opposite directions through the extensions 12a, 12b so that, at a given instant, the induced flux may pass downwardly through the main leg 11 and outwardly in opposite directions through extensions, the lines of force then passing through the air from the extensions to the opposite end of the main leg. On reversal of the flow through coil 15, the flux flows inward through extensions and then unites to flow through the main leg 11, the circuit being completed through air from the end of the main leg to the ends of the extensions. Alternating flux induced by the exciting circuit also flows through the arms 13 in an amount sufficient to overcome the residual magnetism in the arms.

The remote ends of coils 18a and 18b are connected through an adjustable resistor 19 to the terminals of an A. C. microammeter 20. Such an instrument merely indicates the strength of the magnetic field without indicating polarity. If both the strength and polarity of the field are to be determined, the apparatus of which a wiring diagram is shown in Fig. 6 may be used.

The instrument shown in Fig. 1 is illustrated as used in examining a specimen 21 and the instrument is placed in proximity to the specimen with the extensions 12a, 12b and the pick-up arms 13 lying in any field resulting from residual magnetism in the specimen. In some cases, it may be desirable to mount the instrument in permanent relation to the specimen, in which event, as shown in Fig. 4, an exciting winding in two sections 22a, 22b is wound on adjacent sections of the specimen 23. The two sections 22a, 22b are so wound as to cause equal amounts of flux of opposite sign to be induced in adjacent sections of the specimen and the exciting winding is then supplied with alternating current from any suitable source, the leads from the source to the winding including an adjustable resistance 25 and an ammeter 26. Secondary windings 27a and 27b are wound on the specimen in inductive relation to the sections 22a, 22b of the exciting windings and the secondary windings are so connected that the voltages induced therein are opposed. The remote ends of the secondary windings are then connected through an adjustable resistor 28 to an A. C. microammeter 29. The arrangement shown in Fig. 5 may be installed, for example, on shipboard to show the magnetic condition of the hull continuously and thus serve as a means for checking demagnetizing apparatus, when the latter is used.

The modified construction shown in Fig. 5 is generally similar to that illustrated in Fig. 1, except that the core includes a main leg 30 having integral extensions 31a and 31b at one end and integral extensions 32a and 32b at the other end. Extensions 31a, 31b are provided with legs 33a, 33b which lie parallel to the main leg and extend toward and stop just short of extensions 32a and 32b so as to leave air gaps 34. Each of extensions 32a, 32b is provided with a pick-up arm 35 and the ends of the arms are turned down and provided with non-magnetic plates 36 at their ends. An exciting coil 37 is wound on the main leg and extensions 32a, 32b are provided with similar secondary windings 38a, 38b connected in opposition and having their remote ends connected through an adjustable resistor 39 to an A. C. microammeter 40.

The form of the new apparatus, of which a wiring diagram is shown in Fig. 6, is employed when both the strength and polarity of the field to be explored are to be determined. In this apparatus, exciting A. C. current is supplied through lines 41 to a coil 42 on one leg of a core 43 similar in all respects to core 10 of Fig. 1. On the legs 44a, 44b of the core are wound coils 45a, 45b, respectively, and projecting outwardly from the ends of legs 44a and 44b of the core are pick-up arms 46. Coils 45a and 45b are connected together and across their remote terminals 47 and 48 is connected a condenser 49. The condenser is adjustable and may be so adjusted that the inductance of the secondary windings 45a and 45b and the condenser resonate the circuit at the frequency which is a second harmonic of the frequency of the exciting current. The condenser 49 is also adjustable for phasing purposes as will presently be explained.

The output from coils 45a, 45b is fed to an amplifier which is indicated as enclosed within broken lines. This amplifier includes a resistor 50, which is used to calibrate the device by adjusting the gain of the amplifier. A series of resistors 51a, 51b, 51c are used as multipliers, so that when gain control resistor 50 is adjusted, proper calibration multiples for the maximum sensitivity can be selected. The input potential from the calibrated resistor is fed into a suitable resistance-coupled two stage amplifier including two tubes 52 and 53. Tube 53 feeds a center-tapped transformer winding 54, which is used for obtaining phase inversion by connecting its terminals to the grids of tubes 55 and 56. Secondary coil 54a, which is coupled to winding 54, is used to produce inverse feed back to the first tube 52 for stabilizing the operation of the amplifier, although this may be omitted, if desired.

The output from the amplifier is fed to the grids of the pair of tubes 55, 56. By reason of the action of the phase inversion transformer, the potentials on the grids of tubes 55 and 56 are 180° out of phase, and thus the tubes operate in push-pull. The plate circuits of these tubes are connected in parallel, and are fed with current which is a second harmonic of the exciting current and which is obtained from a rectifier. The phase of the potentials on the grids may be said to be compared with the phase of the potential on the plates in the two tubes and this results in a rise of the plate current of one tube and a simultaneous lowering of the plate current of the other. As above indicated, the phase relation of the grid and plate potentials depends on the direction of the magnetic field being detected. A milliameter 57 connected across the plates of the tubes 55, 56, as shown, is used to measure the magnitude and direction of the differential in plate current corresponding to the input to the amplifier. In order to balance the plate currents in the absence of such input, a potentiometer 58 is connected across the leads to the milliameter. The input to the amplifier may be reduced to zero by switching to the lowest point on the multiplier switch. The plate currents may then be adjusted by the potentiometer 58 so that the meter reads zero.

As shown in the diagram, the second harmonic potential supplied to the plates of tubes 55 and 56 is obtained from the unfiltered output of the rectifier. This rectifier includes a phase inversion transformer 59 and a full-wave rectifying tube 60, and supplies a pulsating direct current of second harmonic frequency through lead 61 and potentiometer 58 to the plates of tubes 55 and 56. Direct-current plate potential is supplied to tubes 52 and 53 through resistor 62 and filter network 64 fed with rectified current from tube 60. Resistor 62 and condenser 63 serve to flatten out slightly the sharp depressions at the bottom of the rectified direct current wave so that the wave more nearly resembles a second harmonic wave of true sine form, which is conducted through lead 61.

It has been found that comparatively little amplification is required in the amplifier and, with the apparatus described, the total voltage amplification is approximately 100. The transformer 54 feeds back considerable negative gain resulting in a possible overall voltage amplification of about 10. The meter 57 is a one milliampere meter adjusted for zero center so that the instrument has a variation of one-half milliampere at each side of the center. While these values give an instrument sufficiently sensitive for most commercial purposes, greater sensitivity may be obtained by omitting the negative feed back from transformer 54.

The adjustment of condenser 49 is quite important, particularly for phasing purposes. Preferably with the aid of an oscillograph, condenser 49 is adjusted so that the phase of the voltage applied to one of the output tubes, 55 or 56, is in phase with the plate current, while the voltage applied to the other output tube is out of phase with the plate current.

In the use of the instrument in its various forms, the core with the pick-up arms is moved into the field to be explored, as, for example, as shown in Fig. 1, to a position in which the pickup arms 13, 13 lie close to the specimen 21 to be examined. If the specimen contains residual magnetism, a continuous flux will then appear in arms 13 and extensions 12a, 12b on the core. When current is supplied to the exciting windings 15, alternating flux of equal amount but opposite sign will flow through each extension 12a, 12b, first in one direction and then in the other. The continuous and alternating flux in one extension will be additive at a given instant and will be subtractive in the other extension at the same time. When the exciting current in one extension reverses, the conditions in the other extension will likewise be reversed.

Assuming that the continuous flux is flowing through extensions 12a, 12b and arms 13 in a direction from right to left in Fig. 1, and that the alternating flux at a given instant flows downwardly through main leg 11 of the core and outwardly toward the ends of the extensions, then the alternating flux and the continuous flux are subtractive in extension 12b and additive in extension 12a. As the alternating flux tends to build up in extension 12b, it encounters little reluctance in overcoming the opposed continuous flux, since the reversal of flux occurs at a low point on the saturation curve. As a result, the building up of alternating flux in extension 12b causes a relatively large change in flux in that extension. As the alternating flux tends to build up in extension 12a, greater reluctance is encountered because the presence of the additive continuous flux in this extension brings this portion of the magnetic circuit nearer to saturation. The result is a relatively smaller change in the flux in extension 12a.

The flux through the extensions under the conditions described causes a relatively large voltage to be induced in coil 18a and a relatively smaller voltage to be induced in coil 18b. Upon reversal of the alternating flux caused by reversal in the exciting current, the opposite effects occur and a relatively large voltage is induced in secondary 18b and a relatively smaller voltage induced in secondary 18a. Coils 18a and 18b are connected so that their voltage is in opposition, with the result that only the unbalanced voltage generated in these coils appears across their terminals. This unbalance in voltage occurs each half cycle by reason of the presence of the unidirectional flux arising from the residual magnetism in the specimen. The result is that there is a voltage across the outside terminals of coils 18a, 18b which has a frequency which is twice the frequency of the exciting voltage applied to coil 15, or a second harmonic of the exciting voltage.

With a known excitation of the instrument supplied by the alternating current source, the milliammeter can be calibrated to indicate the strength of the magnetic field in the vicinity of the specimen. Also, since the phase of the second harmonic output supplied to the milliammeter reverses upon reversal of the unidirectional flux through the pick-up arms and core, the milliammeter may be employed to indicate the polarity of the field.

In both cores shown in Figs. 1 and 5, there are air gaps between extensions 12a, 12b, for example, and the opposite end of the main leg 11 of the core. The purpose of the air gaps is to insure that the continuous flux will flow only through the pick-up arms and the extensions of the core and not through the main leg of the latter. As the amount of continuous flux in the extensions is relatively low as compared with the alternating flux, the demagnetizing effect of the alternating flux on the extensions is quite large and substantially no continuous residual flux remains in the extensions after removal of the core from the field being explored. Alternating flux also passes through the pick-up arms in an amount sufficient to completely demagnetize these arms. As the arms are preferably of Mumetal, which has low reluctance, little magnetizing force is required to eliminate the residual magnetism from the arms.

In the construction shown in Fig. 4, the specimen itself provides the path of high permeability for the continuous flux and the sections of the exciting winding are so wound that alternating flux of equal amounts but opposite sign is induced in the adjacent sections of the specimen. The differences in reluctance in the two sections arising from the presence of the unidirectional flux results in unbalanced voltages being induced in the secondary windings 22a, 22b, as previously explained.

When the device shown in Fig. 5 is employed, the core is placed with the insulating plates 36 on the end of the pick-up arms 35 in contact with the surface of the specimen. The gaps in the magnetic path resulting from the presence of the insulating plates then limit the portion of the continuous flux in the specimen entering the pick-up arms and extensions 32a, 32b of the core. This continuous flux is confined to the arms and extensions by air gaps 34 and in adjacent sections of the core on which the secondary windings 28a, 28b are wound, alternating flux of equal amount but opposite sign is produced by the excitation of winding 37. Unbalanced voltages are then induced in the secondaries, as previously explained.

The new instrument makes it possible to determine both the strength and polarity of a magnetic field to be explored, as, for example, that arising from residual magnetism in a specimen, and the use of the instrument does not require that the specimen be magnetized or demagnetized. The instrument may be employed for various purposes and may be employed in indicating the earth's magnetic field. The instrument may, therefore, be employed with suitable auxiliary equipment to form part of a compass or a directional control device.

I claim:

1. In a device for detecting magnetic fields, the combination of a core having a pair of similar extensions from opposite sides at one end forming a cross-bar providing a path for flux induced by an external field, a primary winding on the core, means for supplying alternating current to the primary winding to induce alternating flux in the core, such flux flowing in opposite directions through the extensions and being insufficient when added to the externally induced flux to saturate the path, secondary windings mounted on the extensions to be affected by the algebraic sums of the externally induced and alternating flux in the respective extensions, a pick-up arm mounted on each extension and projecting outwardly from the free end of its extension in alignment therewith, said arm being formed of a single thickness of thin sheet metal of high permeability, and means connecting the secondary windings in opposition, whereby the voltage across the remote terminals of the secondary windings is the unbalanced voltage only.

2. In a device for detecting magnetic fields, the combination of a core formed of a plurality of laminations of sheet metal and having a pair of similar extensions from opposite sides at one end forming a cross-bar providing a path for flux induced by an external field, an exciting winding mounted on the core, similar secondary windings mounted on the extensions and connected in opposition, and a pick-up arm formed of a single thickness of thin sheet metal of high permeability mounted on each extension and projecting outwardly therefrom in alignment therewith.

3. In a device for detecting magnetic fields, the combination of a core, a primary winding thereon, a pair of similar extensions from opposite sides of the core at one end to form a cross-bar lying beyond the end of the primary, a second pair of similar extensions from opposite sides of the core at the other end to form a second cross-bar, which lies beyond the other end of the primary, legs extending parallel to the core from the ends of the second cross-bar toward the first cross-bar and terminating close to but spaced from the latter, and a pick-up arm formed of a single thickness of thin sheet metal of high permeability mounted on each end of the first cross-bar to project outwardly therefrom and in alignment therewith.

EMMETT M. IRWIN.

REFERENCES CITED

The following references are of record in the file of this patent:

UNITED STATES PATENTS

| Number | Name | Date |
|---|---|---|
| 2,047,609 | Antranikian | July 14, 1936 |
| 2,053,154 | La Pierre | Sept. 1, 1936 |
| 2,373,096 | Bonell | Apr. 10, 1945 |

FOREIGN PATENTS

| Number | Country | Date |
|---|---|---|
| 451,850 | British | Aug. 10, 1936 |